United States Patent

[11] 3,573,616

[72] Inventor Hooshang Kahen
 Forest Hills, N.Y.
[21] Appl. No. 807,781
[22] Filed Mar. 13, 1969
[45] Patented Apr. 6, 1971
[73] Assignee International Business Machines Corporation
 Armonk, N.Y.

[54] CURRENT MEASURING SYSTEM HAVING A FEEDBACK PATH INCLUDING A COMBINED HIGH GAIN AMPLIFIER AND INTEGRATOR
1 Claim, 1 Drawing Fig.

[52] U.S. Cl. .................................................... 324/117, 324/45
[51] Int. Cl. ............................................. G01r 33/00, G01r 33/06
[50] Field of Search .......................................... 324/117, 117 (H), 45; 307/309

[56] References Cited
UNITED STATES PATENTS
2,928,048  3/1960  Postal ......................... 324/117X
3,323,057  5/1967  Haley .......................... 324/117
3,422,351  1/1969  Pihl ............................ 324/117
FOREIGN PATENTS
618,580  4/1961  Canada ....................... 324/117

Primary Examiner—Rudolph V. Rolinec
Assistant Examiner—Ernest F. Karlsen
Attorneys—Hanifin and Jancin and John J. Goodwin ABSTRACT: A current-measuring system is provided for measuring over a wide range the flow of direct or alternating current in a conductor. The system includes a magnetic core arranged in two pieces which is clamped around the conductor for producing a magnetic field in response to current flow in the conductor. A magnetic to electric transducer, such as a Hall effect generator, is placed in a gap in the core and the output leads of the Hall effect device is connected to an operational amplifier that integrates the Hall effect signal. The operational amplifier is connected to a current driver, the output of which is connected to windings on the core. The current driver produces an output current in response to the amplifier output signal to oppose the field produced by the core. A resistor is connected between the current driver and the coil and the output voltage across the resistor is a measure of the current in the conductor.

Patented April 6, 1971
3,573,616
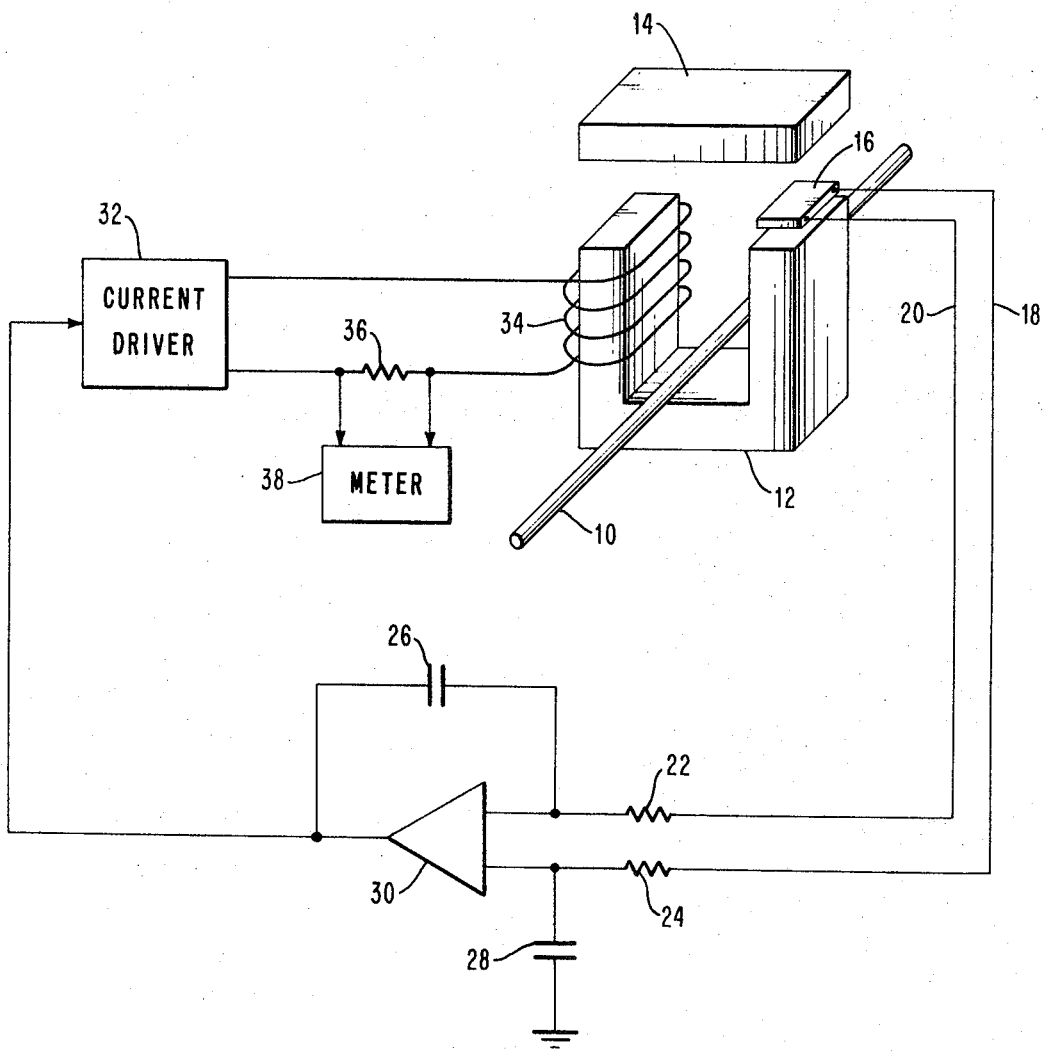
INVENTOR
HOOSHANG KAHEN
BY *John J. Goodwin*
ATTORNEY

CURRENT MEASURING SYSTEM HAVING A FEEDBACK PATH INCLUDING A COMBINED HIGH GAIN AMPLIFIER AND INTEGRATOR

BACKGROUND OF THE INVENTION

1. Field of the Invention

The present invention is in the field of current measurement and more particularly relates to current measuring devices employing cores and Hall effect devices which enable measurements of current in a conductor to be made without disconnecting the conductor or making electrical contact with the conductor.

2. Prior Art

Clamp-on current measuring devices using cores and Hall effect generators are known and described in U.S. Pat. Nos. 3,219,930 entitled "Clamp-On Type Hall Generator Measuring Device," issued Nov. 23, 1965 to H. Sipler; 3,323,057 entitled "Hall Generator Current Meter Having Extraneous Field Compensating Apparatus," issued May 30, 1967 to T. L. Haley; 3,323,056 entitled "DC Measurement Using Conductor Surrounding Core With Plural Hall Generators Having Individual Feedback Coils," issued May 30, 1967 to T. L. Haley; 3,226,640 entitled "DC Measuring Device Using Hall Plates Connected In Feedback Relationship and Having A Common Control Source," issued Dec. 28, 1965 to F. Kuhrt et al.; 3,199,026 entitled "DC Clamp-On Meter Including A Hall Plate Flux Detector," issued Aug. 3, 1965 to D. Leibowitz; and 3,194,939 entitled "Resistance Welding Process Indicating System," issued Jul. 13, 1965 to W. H. Hill.

The prior art patents relate to measuring current in a conductor by detecting the field produced by the current with a clamp-on core and a Hall effect generator. The present invention is distinct from the prior art in that a unique feedback path is used in combination with the core and Hall effect device. The feedback path includes a high gain operational amplifier which operates as an integrator and a current driver connected to windings on the core. The aforesaid U.S. Pat. No. 3,323,056 shows a feedback path in combination with the core and Hall effect device which is structurally and functionally distinct from that of the present invention. The feedback path of the present invention uses DC control whereas the aforesaid U.S. Pat. No. 3,323,056 uses a ripple wave type of AC control.

SUMMARY OF THE INVENTION

It is an object of the present invention to provide a current measuring system for detecting DC/AC current in a conductor over a wide range of current values.

Another object of the present invention is to provide a current measuring system wherein measurements are not affected by temperature changes and residual magnetism.

Still another object of the present invention is to provide a current measuring system employing a feedback path employing an operational feedback amplifier that function as an integrator for providing DC feedback control. The DC control enables the device of the present invention to measure current fluctuations in excess of 60 cycles per second while still using a 60 cycle per second input power source. The use of an integrator feedback amplifier permits almost zero error signal which is desirable since system accuracy is universally proportional to the magnitude of the error signal.

The foregoing and other objects, features and advantages of the invention will be apparent from the following more particular description of a preferred embodiment of the invention, as illustrated in the accompanying drawing.

BRIEF DESCRIPTION OF THE DRAWING

In the drawing:

The FIG. shows a schematic diagram of a current detecting device following the principles of the present invention.

DESCRIPTION OF THE PREFERRED EMBODIMENT

As discussed in the section entitled "Prior Art," current flowing in a conductor can be measured by a core of high magnetic permeability which surrounds the conductor, the core having one or more air gaps into which a magnetic to electric transducer, such as a Hall device or equivalent, is mounted. The Hall device is a solid-state element which produces a voltage whose magnitude is directly proportional to the flux density in the core and the flux density of the core is directly proportional to the magnetizing force produced by the current in the conductor, the magnetizing force being directly proportional to the current flowing through the conductor.

Thus, the use of the core, the Hall device and a suitable meter makes it possible to obtain a direct measurement of the current passing through the conductor. However, magnetic cores change their characteristics such as permeability and flux density under different conditions, such as temperature, and when the current in the conductor ceases, there will be some magnetic field left in the core which is referred to as residual magnetism which changes the amount of the field in the core when current again flows.

The FIG. shows an embodiment of the present invention wherein a current measuring system is provided to eliminate temperature and residual magnetism effects as well as provide other advantages which will be described.

In the FIG. a magnetic core is shown consisting of two pieces 12 and 14. The shape of the pieces are representative, the only requirement being that the core can be placed around the conductor 10. A gap in the core is provided and a Hall effect device 16 is located in the gap. The gap is greatly exaggerated in the FIG. The Hall effect device 16 is a known device which, when located in a magnetic field, produces an output voltage proportional to the flux density.

Presuming current flow in conductor 10, an output voltage representative of the current magnitude appears across output leads 18 and 20 of Hall device 16. Leads 18 and 20 are connected to an operational amplifier which functions as an electronic integrator. An operational amplifier is a DC amplifier, such as amplifier 30, with a feedback path. When the feedback path contains a capacitor, such as capacitor 26, the operational amplifier is an integrator. The operational amplifier also operates as a phase inverter or sign changer with a gain greater than one. For a further discussion of operational amplifiers, see "Electronic Analogue Computers" by Korn and Korn, Second Edition, McGraw-Hill Book Company, Inc., Library of Congress Catalog Card Number 56-8176.

The integrated output signal from the operational amplifier is applied to a current driver 32 which in turn is connected to and supplies current into winding 34. A resistor 36 is connected in series with winding 34. The voltage across resistor 36 is representative of the magnitude of the current in conductor 10 and a meter, recorder, or other suitable device may be connected across resistor 36.

When the current $I_1$ in conductor 10 is zero, the output $e_{T_0}$ of Hall device is also zero, which in turn makes the output $E_o$ from DC amplifier 30 also zero. The output current $I_2$ from current driver 32 is also zero. When $I_1$ is not zero, that is when current flows in conductor 10, an output voltage $e_{T_0}$ will be produced by Hall device 16. The voltage $e_{T_0}$ will produce an output voltage $E_o$ from the operational amplifier which builds up to a constant value in accordance with a time function determined by resistors 22 and 24 and capacitor 26. The voltage $E_o$ is applied to current driver 32 and produces a current I to oppose the field produced in the core by the current $I_1$ in conductor 10. Thus, the integrated output voltage $E_o$ from the operational amplifier is a ramp voltage that builds up to a constant value and produces an output current $I_2$ from current driver 32 which flows in windings 34 to oppose the magnetic field created by the current $I_1$ in conductor 10. This in turn causes the output voltage $e_{T_0}$ from Hall device 16 to become zero. The operational amplifier acts as a holding circuit and the output voltage $E_o$ stays at a constant level and maintains the current $I_2$ in windings 34 at a constant value as long as there is no change in the current $I_1$ in conductor 10.

The value of the current $I_1$ in conductor 10 is determined by the current $I_2$ which is measured by obtaining the voltage across resistor 36 and dividing it by the value of the resistance. The current $I_1$ is then determined by the transformer equation $N_1 I_1 = N_2 I_2$ where N is the half turn winding associated with the Hall device 16 and $N_2$ is the number of turns of winding 34. These relationships can be incorporated into the design of a meter 38 which, when connected across resistor 36, provides a direct indication of current measurement for current $I_1$.

The current $I_1$ can also be determined from the steady state value of the voltage $E_o$ from the operational amplifier by taking into account the relationship between $E_o$, $I_2$ and the turns ratio $N_1/N_2$.

The primary application of the present invention is the measurement of DC current because AC current in conductor 10 can be readily measured by transformer action. However, the present invention has the feature that it can also measure AC current flowing in conductor 10 provided meter 38 is the RMS type.

While the invention has been particularly shown and described with reference to a preferred embodiment thereof, it will be understood by those skilled in the art that various changes in form and details may be made therein without departing from the spirit and scope of the invention.

I claim:

1. Apparatus for measuring current flowing in a conductor comprising:
   a core of magnetic material surrounding said conductor and having at least one air gap, said core providing a path for the magnetic field produced by said current, said core of magnetic material including first and second core pieces adapted to be placed together around said conductor;
   a Hall effect magnetic to electric transducer located in said air gap for producing an output voltage representative of said magnetic flux;
   an operational amplifier including a DC amplifier having a feedback path including a capacitor, said operational amplifier connected to said magnetic to electric transducer for integrating and phase inverting the output voltage from said magnetic to electric transducer, current means connected to the output of said operational amplifier for producing a current in response to the output voltage of said operational amplifier;
   and a conductive winding connected to the output of said current means and wound around said magnetic core for producing a magnetic field equal and opposite to the magnetic field produced by said conductor;
   and a resistor connected in series with said conductive winding and a meter connected across said resistor to measure the voltage across said resistor to provide an indication of the value of the current flowing in said conductor; and
   said operational amplifier integrating the output voltage of said transducer for driving said current means so as to provide a current output sufficient to cause the output voltage of said transducer to become zero and said amplifier further maintaining a voltage output representative of said magnetic flux.